(12) United States Patent
Freissle et al.

(10) Patent No.: US 7,604,127 B2
(45) Date of Patent: Oct. 20, 2009

(54) SCREENING ARRANGEMENT

(76) Inventors: Manfred Franz Axel Freissle, 15 Oak Avenue, Oakdene, Johannesburg, Gauteng (ZA); Peter Helmut Franz Freissle, 385 Montagu Dr., Spartanburg, SC (US) 29301

( * ) Notice: Subject to any disclaimer, the term of this patent is extended or adjusted under 35 U.S.C. 154(b) by 0 days.

(21) Appl. No.: 11/775,403

(22) Filed: Jul. 10, 2007

(65) Prior Publication Data

US 2007/0284292 A1  Dec. 13, 2007

Related U.S. Application Data

(62) Division of application No. 10/911,897, filed on Aug. 5, 2004, now Pat. No. 7,240,801, which is a division of application No. 10/212,670, filed on Aug. 5, 2002, now Pat. No. 6,957,741.

(60) Provisional application No. 60/310,651, filed on Aug. 7, 2001.

(51) Int. Cl.
  *B07B 1/49* (2006.01)
(52) U.S. Cl. .................... 209/412; 209/405; 209/408
(58) Field of Classification Search ............... 209/319, 209/405, 408, 409, 412
  See application file for complete search history.

(56) References Cited

U.S. PATENT DOCUMENTS

| | | | |
|---|---|---|---|
| 1,939,314 A | 12/1933 | Neifert et al. | |
| 1,957,770 A | 5/1934 | Freeze | |
| 2,183,157 A | 12/1939 | Swedman | |
| 2,255,939 A | 9/1941 | Overstrom et al. | |
| 2,321,675 A | 6/1943 | Hauge | |
| 2,335,084 A | 11/1943 | Rice | |

(Continued)

FOREIGN PATENT DOCUMENTS

CA  2181321  7/1996

(Continued)

OTHER PUBLICATIONS

English Translation of EP 167 199 A, Published Jan. 1986.*

(Continued)

*Primary Examiner*—Patrick H Mackey
*Assistant Examiner*—Terrell H Matthews
(74) *Attorney, Agent, or Firm*—Dority & Manning, P.A.

(57) ABSTRACT

A screening panel 10 comprises a peripheral frame 12 consisting of a pair of mutually laterally spaced side members 14, 16, which are integral with a pair of mutually axially spaced end members 18, 20. The side members 14, 16 and end members 18, 20 define corners of the panel 22.1, 22.2, 22.3 and 22.4 and the peripheral frame 12 where they meet. A plurality of mutually spaced ribs 15 extend across the periphery of the panel 10 to define a screening surface. The side members and end members are rectangular in cross-section, thereby defining substantially flat upper peripheral surfaces 12.1, outer peripheral surface 12.2 and lower peripheral surface 12.3 of the peripheral frame 12 and thus also the panel 10. The panel 10 includes locating recesses 24 provided at or near to the corners 22.1, 22.2, 22.3 and 22.4 of the panel 10. The panel 10 also has separate securing recesses in the form of semi-circular grooves 30 formed in the lower surface 12.3 of the panel 10, around the locating recess 24 and concentrically therewith.

7 Claims, 6 Drawing Sheets

U.S. PATENT DOCUMENTS

| | | | |
|---|---|---|---|
| 2,391,501 A | 12/1945 | O'Brien | |
| 2,487,914 A | 11/1949 | Woolcott et al. | |
| 2,576,794 A | 11/1951 | Jost et al. | |
| 3,074,134 A | 1/1963 | Bruechler | |
| 3,363,381 A | 1/1968 | Forrest | |
| 3,390,771 A | 7/1968 | Wehner | |
| 3,456,795 A | 7/1969 | Svensson et al. | |
| 3,456,796 A | 7/1969 | Eck et al. | |
| 3,565,251 A | 2/1971 | Pennington | |
| 3,795,311 A | 3/1974 | Martin | |
| 3,865,720 A | 2/1975 | Wilson | |
| 3,882,652 A | 5/1975 | Marchello | |
| 3,900,628 A | 8/1975 | Stewart | |
| 3,905,897 A | 9/1975 | Jacobson | |
| 3,980,555 A | 9/1976 | Freissle | |
| 4,062,769 A | 12/1977 | Simonson | |
| 4,120,785 A | 10/1978 | Kanamori et al. | |
| 4,141,821 A | 2/1979 | Wolff | |
| 4,219,161 A | 8/1980 | Freissle | |
| 4,222,865 A | 9/1980 | Valeri et al. | |
| 4,265,742 A | 5/1981 | Bücker et al. | |
| 4,278,535 A | 7/1981 | Wolff | |
| 4,347,129 A | 8/1982 | Rutherford | |
| 4,383,919 A | 5/1983 | Schmidt | |
| 4,391,559 A | 7/1983 | Mizusawa | |
| 4,405,272 A | 9/1983 | Wollar | |
| 4,409,099 A | 10/1983 | Wolff | |
| 4,563,270 A | 1/1986 | Wolff | |
| 4,661,245 A | 4/1987 | Rutherford et al. | |
| 4,670,136 A | 6/1987 | Schmidt et al. | |
| 4,716,694 A | 1/1988 | Freissle | |
| 4,757,664 A | 7/1988 | Freissle | |
| 4,762,610 A | 8/1988 | Freissle | |
| D302,019 S | 7/1989 | Dehlén | |
| 4,857,176 A | 8/1989 | Derrick et al. | |
| 4,871,288 A * | 10/1989 | Schmidt et al. | 411/45 |
| 4,882,044 A | 11/1989 | Freissle | |
| 4,885,040 A | 12/1989 | Wolff | |
| 4,892,767 A | 1/1990 | Freissle | |
| 4,909,929 A | 3/1990 | Tabor | |
| 4,932,112 A | 6/1990 | Tikkanen | |
| 5,045,184 A | 9/1991 | Arkles | |
| 5,049,262 A | 9/1991 | Galton et al. | |
| 5,112,475 A | 5/1992 | Henry, Jr. | |
| 5,213,217 A | 5/1993 | Galton et al. | |
| 5,248,043 A | 9/1993 | Dorn | |
| 5,255,790 A | 10/1993 | Einoder et al. | |
| 5,267,246 A | 11/1993 | Huang et al. | |
| 5,277,319 A | 1/1994 | Henry, Jr. | |
| 5,361,911 A | 11/1994 | Waites, Sr. et al. | |
| 5,363,970 A | 11/1994 | Freissle | |
| 5,372,261 A | 12/1994 | Galton et al. | |
| 5,385,242 A | 1/1995 | Freissle | |
| 5,462,175 A | 10/1995 | Bokor | |
| 5,464,101 A | 11/1995 | Freissle | |
| 5,664,685 A | 9/1997 | Freissle | |
| 5,699,918 A | 12/1997 | Dunn | |
| 5,755,334 A | 5/1998 | Wojcik et al. | |
| 5,769,240 A | 6/1998 | Middour et al. | |
| 5,769,241 A | 6/1998 | Woodgate | |
| 5,816,412 A | 10/1998 | Bokor | |
| 5,816,413 A | 10/1998 | Boccabella et al. | |
| 5,829,599 A * | 11/1998 | Woodgate | 209/399 |
| 5,938,042 A | 8/1999 | Freissle et al. | |
| 5,957,741 A * | 9/1999 | Evans | 441/75 |
| 6,070,737 A | 6/2000 | Russell et al. | |
| 6,206,200 B1 * | 3/2001 | Gilles et al. | 209/399 |
| D445,437 S | 7/2001 | Sawall et al. | |
| 6,253,926 B1 | 7/2001 | Woodgate | |
| 6,260,711 B1 | 7/2001 | Woodgate | |
| 6,267,246 B1 | 7/2001 | Russell et al. | |
| 6,634,505 B1 | 10/2003 | Sawall et al. | |
| RE38,303 E | 11/2003 | Askew | |
| 6,957,741 B2 * | 10/2005 | Freissle et al. | 209/405 |
| 7,240,801 B2 * | 7/2007 | Freissle et al. | 209/405 |
| 7,273,151 B2 * | 9/2007 | Sawall et al. | 209/405 |
| 7,296,685 B2 | 11/2007 | Malmberg | |
| 2003/0012833 A1 | 1/2003 | Freissle et al. | |
| 2004/0074820 A1 | 4/2004 | Sawall et al. | |

FOREIGN PATENT DOCUMENTS

| | | |
|---|---|---|
| DE | 1155963 | 10/1963 |
| DE | 3123405 | 4/1982 |
| DE | 3606854 | 9/1987 |
| DE | 3724246 | 2/1989 |
| DE | 4140210 | 6/1993 |
| DE | 19707092 | 8/1998 |
| EP | 0167999 A2 | 1/1986 |
| EP | 0202863 | 11/1986 |
| FR | 2574007 | 6/1986 |
| GB | 2092917 | 8/1982 |
| WO | WO 8905202 | 6/1989 |
| WO | WO 9005594 | 5/1990 |
| WO | WO 0053343 A1 | 9/2000 |
| WO | WO 0064599 | 11/2000 |
| WO | WO 0073669 A1 | 12/2000 |
| WO | WO 03047771 | 6/2003 |
| ZA | 735815 | 8/1973 |
| ZA | 740027 | 1/1975 |
| ZA | 745121 | 1/1976 |
| ZA | 745131 | 1/1976 |
| ZA | 745092 | 5/1976 |
| ZA | 771322 | 5/1978 |
| ZA | 771362 | 5/1978 |
| ZA | 775426 | 2/1979 |
| ZA | 775496 | 2/1979 |
| ZA | 818723 | 11/1982 |
| ZA | 818724 | 11/1982 |
| ZA | 818725 | 11/1982 |
| ZA | 818783 | 11/1982 |
| ZA | 818784 | 11/1982 |
| ZA | 818785 | 11/1982 |
| ZA | 825021 | 4/1983 |
| ZA | 825061 | 4/1983 |
| ZA | 855126 | 7/1985 |
| ZA | 855136 | 7/1985 |
| ZA | 852624 | 10/1985 |
| ZA | 863726 | 1/1987 |
| ZA | 863796 | 1/1987 |
| ZA | 866976 | 4/1987 |
| ZA | 867986 | 5/1987 |
| ZA | 870436 | 6/1987 |
| ZA | 877168 | 4/1988 |
| ZA | 883971 | 5/1988 |
| ZA | 894955 | 4/1990 |
| ZA | 896821 | 10/1990 |
| ZA | 902563 | 1/1991 |
| ZA | 917021 | 5/1992 |
| ZA | 920994 | 10/1992 |
| ZA | 929933 | 6/1993 |
| ZA | 938247 | 6/1994 |
| ZA | 940452 | 9/1994 |
| ZA | 946891 | 4/1995 |
| ZA | 950711 | 8/1995 |
| ZA | 978673 | 3/1999 |
| ZA | 010631 | 6/2001 |
| ZA | 200301469 | 11/2003 |

OTHER PUBLICATIONS

Abstract of S. African Patent No. 74/0027 (1974).
Abstract of S. African Patent No. 74/5131 (1975).
Abstract of S. African Patent No. 77/1362 (1978).
Abstract of S. African Patent No. 77/5496 (1979).

Abstract of S. African Patent No. 81/8783 (1982).
Abstract of S. African Patent No. 81/8784 (1982).
Abstract of S. African Patent No. 81/8785 (1982).
Abstract of S. African Patent No. 82/5061 (1983).
Abstract of S. African Patent No. 85/2624 (1985).
Abstract of S. African Patent No. 86/3796 (1986).
Abstract of S. African Patent No. 86/6976 (1987).
Abstract of S. African Patent No. 86/7986 (1987).
Abstract of S. African Patent No. 87/7168 (1988).
Abstract of S. African Patent No. 88/3971 (1988).
Abstract of S. African Patent No. 89/4955 (1990).
Abstract of S. African Patent No. 89/6821 (1990).
Abstract of S. African Patent No. 90/2563 (1990).
Abstract of S. African Patent No. 91/7021 (1992).
Abstract of S. African Patent No. 92/9933 (1993).
Abstract of S. African Patent No. 93/8247 (1994).
Abstract of S. African Patent No. 94/0452 (1994).
Abstract of S. African Patent No. 94/6891 (1995).
Abstract of S. African Patent No. 95/0711 (1995).
Abstract of S. African Patent No. 97/8673 (1997).
English Translation of EP 0167999 A2 (1986).
S. African Registered Design No. 87/0436 (1987).
S. African Registered Design No. 92/0994 (1992).
Brochure regarding Poly-Norr-Tab™ Screen Cloth by Norris Screen & Manufacturing, Inc.- 1985.
Letter dated Nov. 2, 2004 regarding photographs and brochure of the Poly-Norr-Tab™ by Norris Screen & Manufacturing, Inc.- 1985.
Photographs regarding Poly-Norr-Tab™ Screen Cloth by Norris Screen & Manufacturing, Inc.- 1985.
English Abstract of German Patent No. 3123405, Apr. 8, 1982.
English Abstract of German Patent No. 3606854, Sep. 10, 1987.
English Abstract of German Patent No. 3724256, Feb. 2, 1989.
English Abstract of French Patent No. 2574007, Jun. 6, 1986.

* cited by examiner

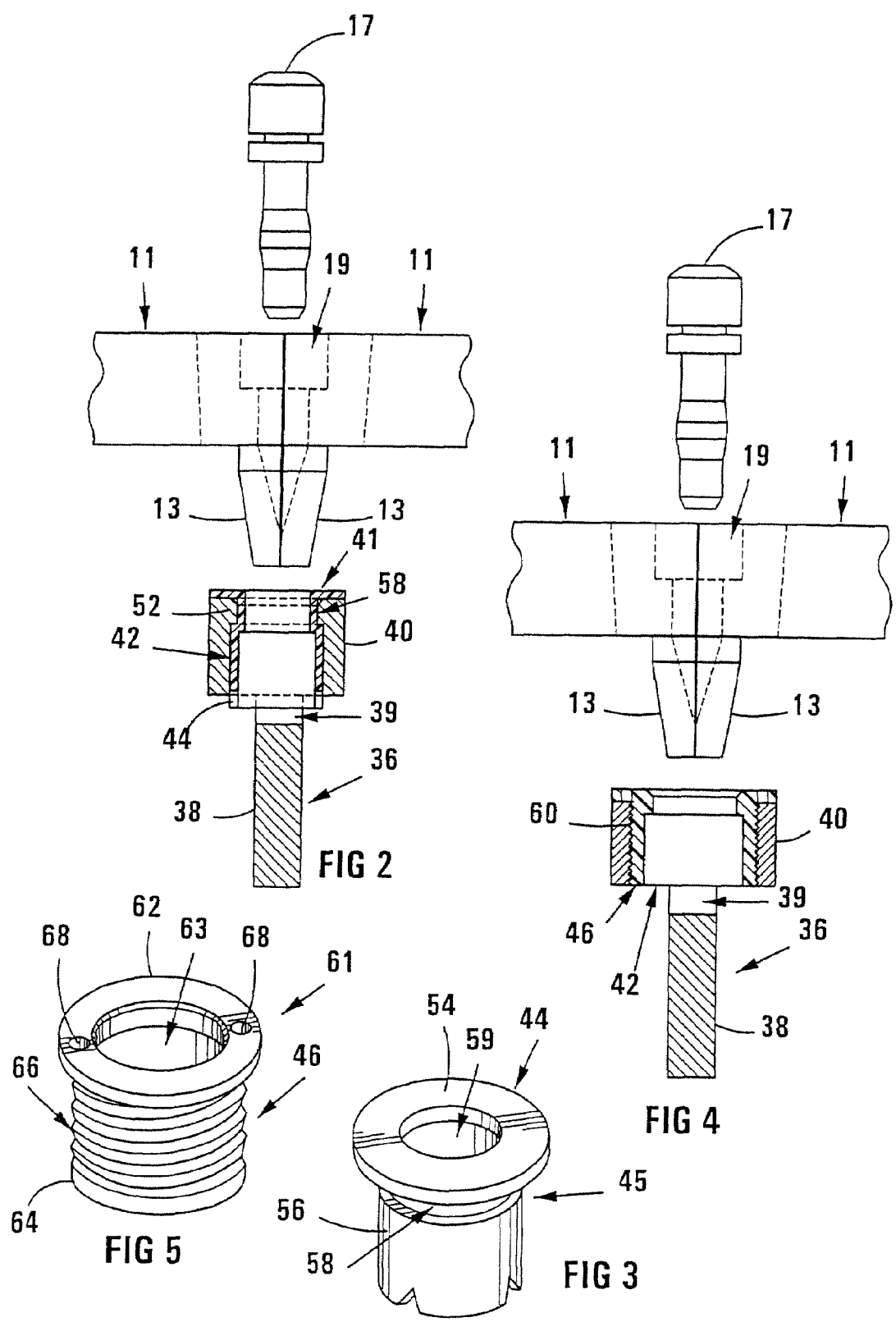

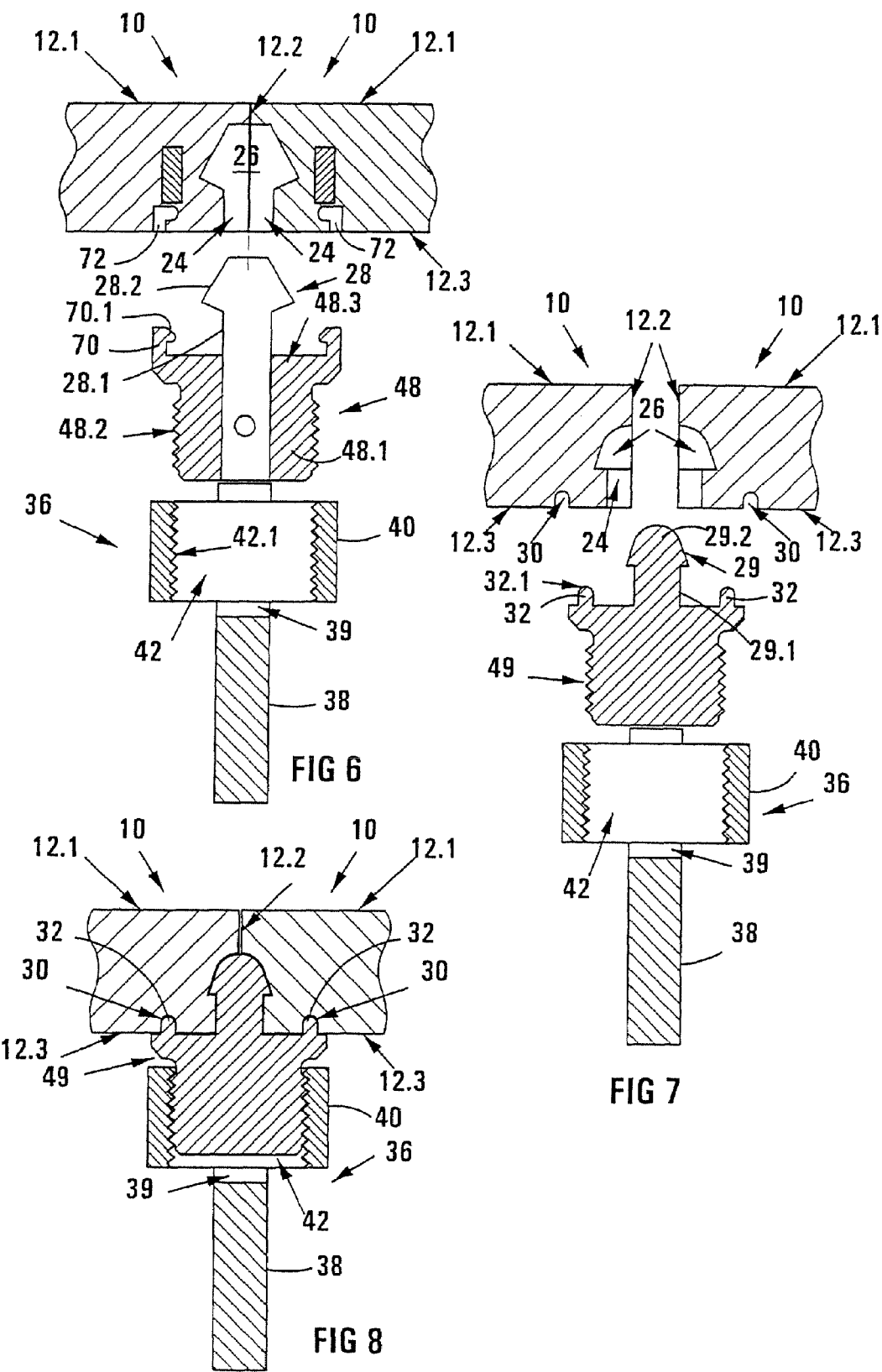

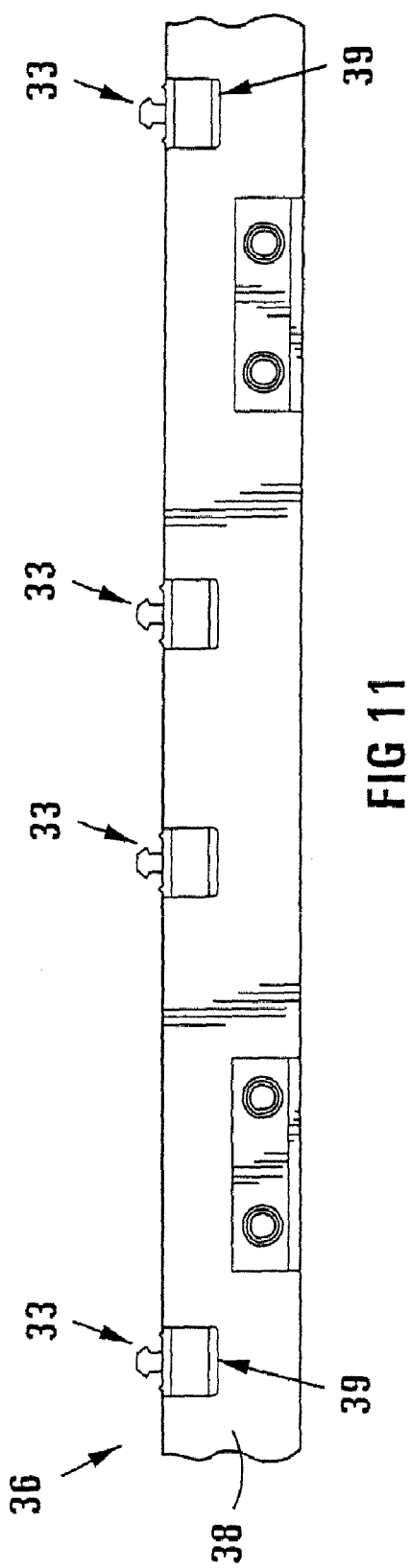
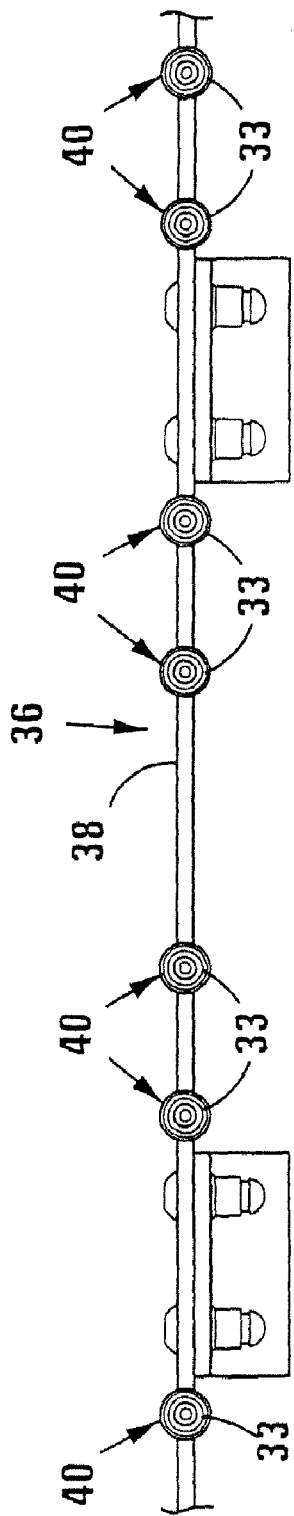
FIG 11
FIG 12

SCREENING ARRANGEMENT

RELATED APPLICATIONS

The present application is a divisional of U.S. application Ser. No. 10/911,897 filed on Aug. 5, 2004 (issued as U.S. Pat. No. 7,240,801 on Jul. 10, 2007), which is a divisional application of U.S. application Ser. No. 10/212,670 filed on Aug. 5, 2002 (issued as U.S. Pat. No. 6,957,741 on Oct. 25, 2005), which claims priority to U.S. provisional application Ser. No. 60/310,651 filed on Aug. 7, 2001.

THIS INVENTION relates to a screening arrangement. The invention relates in particular to a screening arrangement for screening particulate materials such as mineral ores of all types. More particularly, the invention relates to a screening element; a screening element securing device for securing a screening element to a screen support frame; a screen support frame sub-assembly; a screen support frame; and a screening arrangement.

According to one aspect of the invention, there is provided a screening element securing device for securing a screening element to a screen support frame, said securing device including a body portion having a connecting formation for connection to a complementary formation on a screen support member of a screen support frame to render the screening element securing device releasably connected to the screen support member; and a locating formation, provided on the body portion, for engagement with a complementary formation on a screening element to locate the screening element on the screen support frame.

The body portion may comprise an insert for insertion in an opening in the screen support member, the connecting formation being provided on the insert and being for connection to a complementary formation in the opening.

The locating formation may be provided on the insert and comprises a locating protrusion for location in a locating recess of a screening element.

The locating protrusion may comprise a shank which extends axially away from the body portion, and a head formed at the free end of the shank.

In one version of this aspect of the invention, the securing device may include a securing formation, separate from the locating formation, which is receivable in a complemental securing formation on the screening element.

The separate securing formation may comprise a separate securing protrusion.

The separate securing protrusion may comprise an annular ridge which stands proud axially of the insert and around the locating protrusion.

The connecting formation may comprise a screw thread for connection to a complementary connecting formation comprising a complementary screw thread.

In one embodiment of this version, the insert may be monolithic and substantially cylindrical, the screw thread being provided on its outer surface, and the insert, shank, head and the annular ridge being unitary.

In another embodiment of this version of the invention the insert may comprise a peripheral flange and a skirt fast with the flange, the connecting formation connectable with a complementary connecting formation on a screen support member being a peripheral radially outwardly facing groove defined in the body portion between the flange and the skirt, the body portion being resiliently deformable, the annular ridge standing proud axially of the peripheral flange, the insert defining an axial bore for receiving a pin which pin includes the shank and the head.

In another version of this aspect of the invention, the insert may define a locating formation in the form of a secondary opening for engaging the complementary formation on the screening element for locating and securing the screening element to the screen support member, the connecting formation on the insert comprising an external radially outwardly facing peripheral groove for connection with a complementary connecting formation in the form of an opening in a screen support member.

In one embodiment of this version, the insert may comprise a peripheral flange and a skirt fast with the flange, the external peripheral groove being defined in the insert between the flange and the skirt, the skirt and the flange defining the secondary opening.

In another embodiment of this version, the insert may define a locating formation in the form of a secondary opening for engaging the complementary formation on the screening element for locating and securing the screening element to the screen support member, the connecting formation on the insert being in the form of an external screw thread connectable with a complementary screw thread in an opening in the screen support member.

In this embodiment, the insert may comprise a peripheral flange and a skirt fast with the flange, the screw thread being provided on the outer surface of the skirt, and the skirt and the flange together defining the secondary opening.

The securing device may be of a hard-wearing synthetic plastics material, such as polyurethane.

According to another aspect of the invention, there is provided a screening element which has a peripheral frame defining an opening across which a plurality of mutually spaced ribs extend to define a screening surface, the peripheral frame having an upper surface on the same side of the screening element as the screening surface, a lower surface on its side opposite its upper surface and an outer peripheral surface interconnecting the upper and lower surfaces, the peripheral frame being provided on its lower surface with locating formations for engagement with complementary locating formations on a screen support frame to locate the screening element on the screen support frame, and the peripheral frame being provided on its lower surface with separate securing formations for engagement with complementary separate securing formations on the screen support frame to secure the screening element against displacement on the screen support frame.

The locating formations may include locating recesses provided in the lower surface of the peripheral frame, respectively for receiving locating means in the form of locating protrusions on the screen support frame, for locating adjacent screening elements in position on the screen support frame.

The separate securing formations may include securing recesses provided in the lower surface of the peripheral frame, respectively for receiving securing means in the form of securing protrusions on the screen support frame, for securing the screening element against displacement on the screen support frame.

The screening element may be in the form of a screening panel, the peripheral frame comprising a pair of mutually laterally spaced side members which are integral with a pair of mutually longitudinally spaced end members, said side members and end members defining corners of the panel and peripheral frame where they meet.

The side members and end members of the frame may be rectangular in cross-section, thereby defining a substantially flat upper surface, a substantially flat lower surface and a substantially flat outer peripheral surface for the peripheral frame.

The locating recesses may be provided at or near the corners of the panel.

The locating recesses may intersect the outer peripheral surface of the peripheral frame, and may be shaped such that when similar locating recesses on adjacent panels are brought into register, they and the similar locating recesses together define a locating socket into which a locating protrusion on the screen support frame is receivable to locate adjacent panels in position on the support frame.

The separate securing recesses may be formed in the panels near the locating recesses.

The securing recesses may be endless grooves formed in the lower peripheral surface of the panel, each extending partly around one of the locating recesses, there being a securing recess for each locating recess.

The grooves may be semi-circular in shape such that, when respectively brought into register with similar semi-circular grooves on adjacent panels, they and the similar grooves together define annular grooves around their associated locating recesses, for receiving complementary annular securing protrusions on the support frame, to secure the screening element against displacement on the support frame in use.

The screening panel may be of resiliently deformable material selected from the group consisting of plastics materials and elastomeric materials, such that the protrusions fit with interference, or clip, into their associated recesses.

The plastics material may be polyurethane and the elastomeric material may be rubber.

According to a further aspect of the invention there is provided a screen support frame sub-assembly which includes an elongate screen support member of a screen support frame, the screen support member having connecting formations; and a plurality of securing devices releasably connected to the connecting formations of the screen support member;

each securing device including a body portion having a connecting formation for connection to the connecting formations on the screen support member to render the screening element securing device releasably connected to the screen support member; and a locating formation, provided on the body portion, for engagement with a complementary formation on a screening element to locate the screening element on the screen support frame.

According to yet a further aspect of the invention there is provided a screen support frame which includes a plurality of screen support frame sub-assemblies spaced from and parallel to one another and spaced apart from one other by a plurality of spacer bars, each sub-assembly including an elongate screen support member having connecting formations; and a plurality of securing devices releasably connected to the connecting formations of the screen support member;

such securing device including a body portion having a connecting formation for connection to the connecting formation on the screen support member to render the screening element securing device releasably connected to the screen support frame; and a locating formation, provided on the body portion, for engagement with a complementary formation on a screening element to locate the screening element on the screen support frame.

According to a still further aspect of the invention there is provided a screening arrangement which includes a screen support frame and a plurality of screening elements secured thereon, each screening element having a peripheral frame defining an opening across which a plurality of mutually spaced ribs extend to define a screening surface, the peripheral frame having an upper surface on the same side of the screening element as the screening surface, a lower surface on its side opposite its upper surface and an outer peripheral surface interconnecting the upper and lower surfaces, the peripheral frame being provided on its lower surface with locating formations for engagement with complementary locating formations on a screen support frame to locate the screening element on the screen support frame, the screen support frame including a plurality of screen support frame sub-assemblies spaced from and parallel to one another and spaced apart from one other by a plurality of spacer bars, each sub-assembly including an elongate screen support member having connecting formations; and a plurality of securing devices releasably connected to the connecting formations of the screen support member;

each securing device including a body portion having a connecting formation for connection to the connecting formation on the screen support member to render the screening element securing device releasably connected to the screen support member; and a locating formation, provided on the body portion, for engagement with a complementary formation on the screening element to locate the screening element on the screen support frame.

The peripheral frame of the screening element may be provided on its lower surface with separate securing formations for engagement with complementary separate securing formations on the screen support frame to secure the screening element against displacement on the screen support frame.

The invention will now be described by way of example, with reference to the accompanying diagrammatic drawings, in which:—

FIG. 1 is an under plan view of a screening panel according to one aspect of the invention;

FIG. 2 is a cross-sectional fragmentary view of a screen support frame sub-assembly according to another aspect of the invention, also showing, in fragmentary view, a pair of conventional screening panels (not according to the invention) about to be secured to the screen support frame sub-assembly and in cross-section, one embodiment of a securing device according to another aspect of the invention;

FIG. 3 is a three-dimensional view of the securing device of FIG. 2;

FIG. 4 is a cross-sectional fragmentary view of a screen support frame sub-assembly according to the invention, also showing, in fragmentary view, a pair of conventional screening panels (not according to the invention) about to be secured to the screen support frame component, and in cross-section, another embodiment of a securing device according to another aspect of the invention;

FIG. 5 shows a three-dimensional view of the securing device of FIG. 4;

Figure 9:
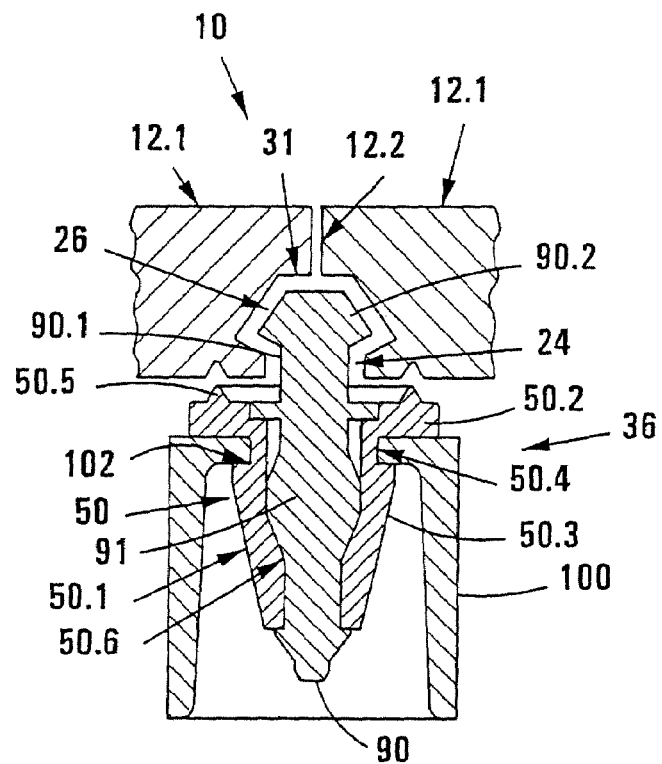
Figure 10:
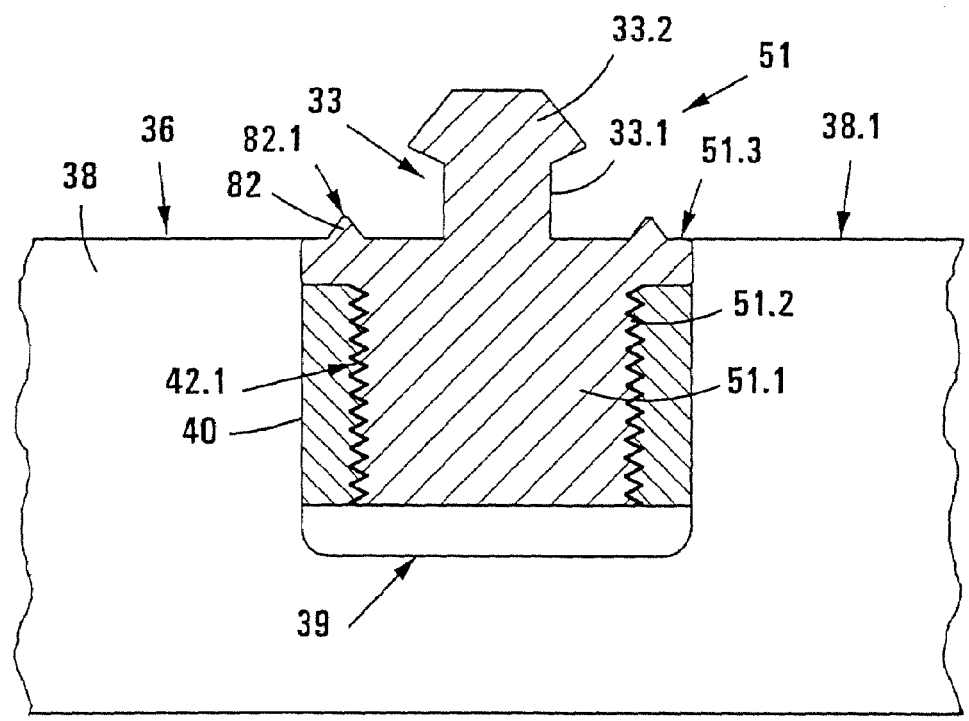

FIG. 6 shows a cross-sectional exploded view of a screen support frame sub-assembly and in fragmentary view a pair of screening panels according to the invention with locating and securing formations to locate and secure the screening panels to the screen support frame component sub-assembly, and in cross-section, another embodiment of a securing device according to another aspect of the invention;

FIG. 7 shows a cross-sectional fragmentary exploded view, similar to FIG. 6, of another embodiment of the invention;

FIG. 8 shows a fragmentary cross-sectional view of the version of the embodiment of FIG. 7 once the locating and securing formations on the screening elements have engaged complementary formations on a securing device of the screen support frame sub-assembly;

FIG. 9 shows a fragmentary cross-sectional view of screening panels, another embodiment of a screen support frame sub-assembly and another embodiment of a securing device according to the invention;

FIG. 10 shows a fragmentary partly cross-sectional side view of an elongate screen support member of a screen support frame sub-assembly having tubular members affixed thereto and securing devices according to another embodiment of the invention connected to the tubular members;

FIG. 11 shows a fragmentary side view of a screen support frame sub-assembly according to the invention;

FIG. 12 shows a top plan view of the sub-assembly of FIG. 11; and

Figure 13:
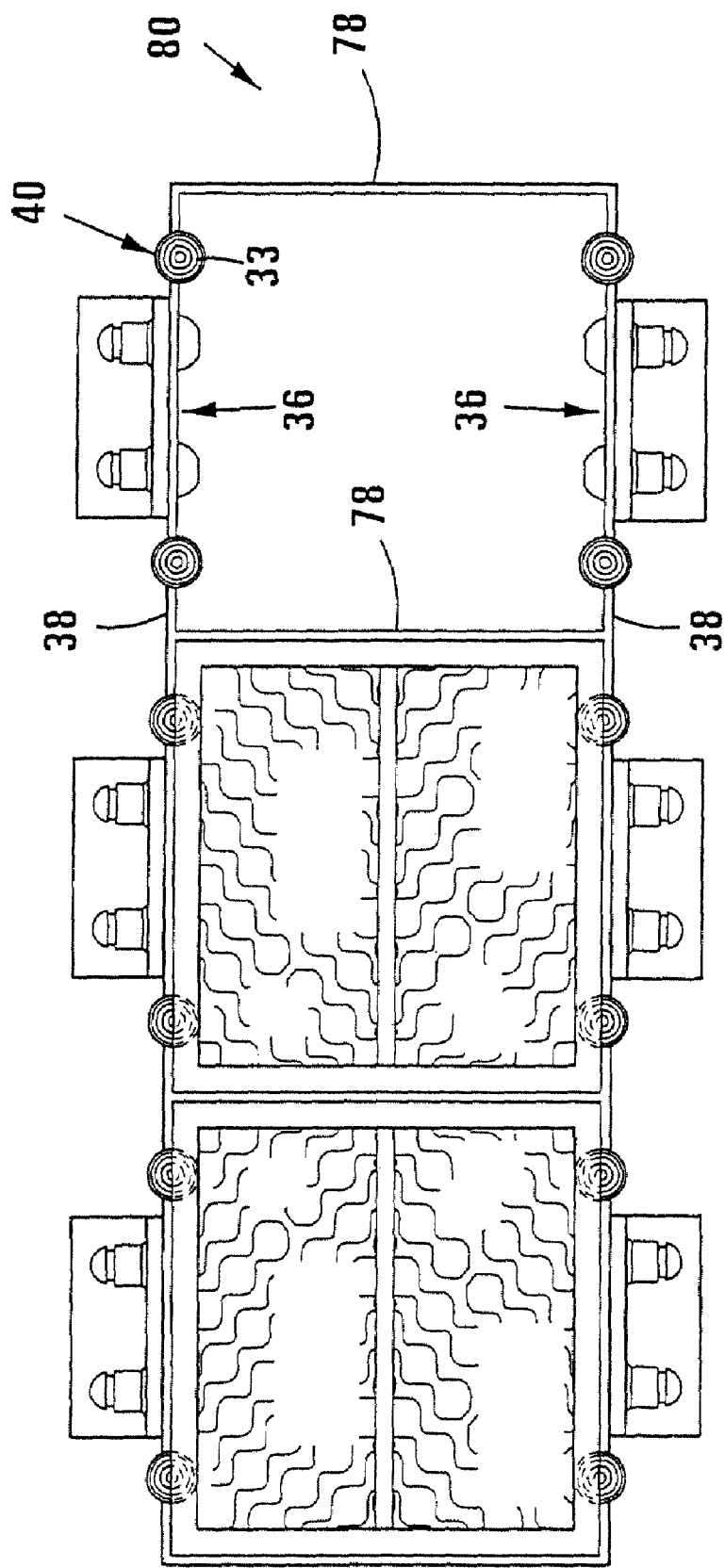

FIG. 13 shows a fragmentary top plan view of a screen support frame and screening arrangement in accordance with another aspect of the invention.

Figure 1:
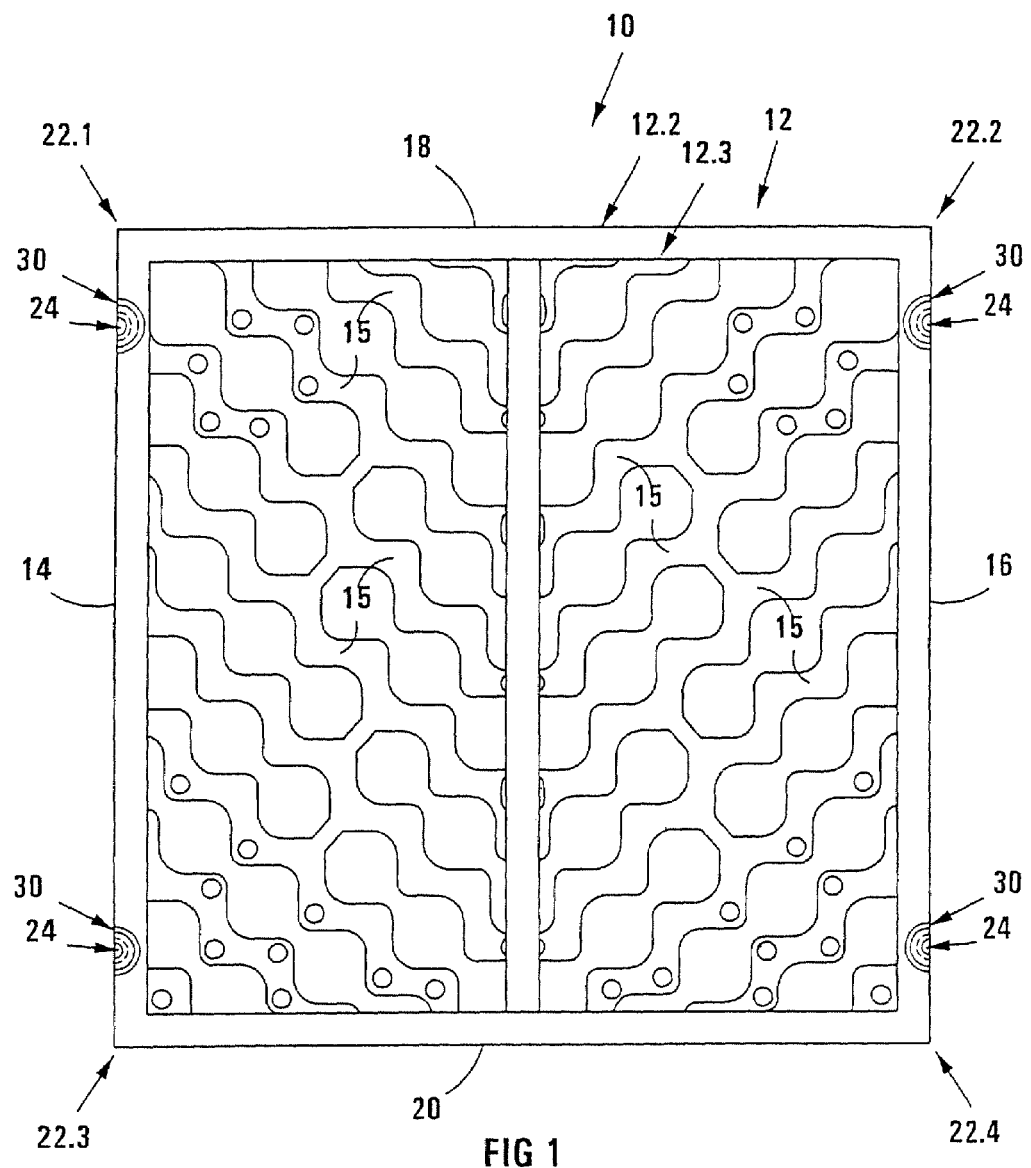

In FIG. 1 of the drawings, reference numeral 10 generally indicates a screening panel in accordance with one aspect of the invention. The screening panel comprises a peripheral frame 12 consisting of a pair of mutually laterally spaced side members 14, 16, which are integral with a pair of mutually axially spaced end members 18,20. The side members 14, 16 and end members 18, 20 define corners of the panel 22.1, 22.2, 22.3 and 22.4 and the peripheral frame 12 where they meet. A plurality of mutually spaced ribs 15 extend across the periphery of the panel 10 to define a screening surface (not shown). As shown in FIG. 1, the ribs 15 may have a zig-zag configuration. The side members and end members are rectangular in cross-section, thereby defining substantially flat upper peripheral surfaces 12.1 (FIGS. 6, 7 and 8), outer peripheral surface 12.2 and lower peripheral surface 12.3 of the peripheral frame 12 and thus also the panel 10. The panel 10 includes locating recesses 24 provided at or near to the corners 22.1, 22.2, 22.3 and 22.4 of the panel 10. The locating recesses 24 are formed in the lower peripheral surface 12.3 and intersect the outer peripheral surface 12.2 of the panel 10 as can more clearly be seen in FIGS. 6, 7, 8 and 9 of the drawings. As may also more clearly be seen from FIGS. 6, 7, 8 and 9 of the drawings, when similar locating recesses 24 on adjacent panels 10 are brought into register with one another, they together define a locating socket 26 into which a protrusion or spigot 28, 29, 31, 33 which is complementarily shaped, can be received to locate adjacent panels 10 in position on a support frame 80 (see FIG. 13).

The panel 10 also has separate securing recesses in the form of semi-circular grooves 30 formed in the lower surface 12.3 of the panel 10, around the locating recess 24 and concentrically therewith. As can be seen from FIGS. 8 and 9, when brought into register with a similar semi-circular groove 30 on an adjacent panel 10, the grooves 30 together define an annular groove to receive a complemental securing formation in the form of an annular ridge 32 on a screen support frame sub-assembly 36.

The invention extends to a screen support frame sub-assembly generally indicated by reference numeral 36. In the embodiment shown in FIGS. 2, 4, 6, 7, 8 and 10, the elongate screen support member of the sub-assembly 36 is an elongate bar 38 which has a rectangular cross-sectional profile of oblong shape, and cut-outs 39 into which tubular elements 40 can fit and are affixed to the bar by welding such that the longitudinal axis of the tubular element 40 extends in the direction of the longitudinal axis of the oblong cross-sectional profile of the bar 40. Each tubular element 40 defines an opening in the screen support member 38 which opening is a primary socket 42 into which a securing device, generally indicated by reference numeral 44 in FIGS. 2 and 3, 46 in FIGS. 4 and 5, 48 in FIG. 6, 49 in FIGS. 7 and 8, and 51 in FIG. 10, is releasably connectable as will be explained below.

It is to be understood that the versions of the securing devices and sub-assemblies of the invention shown in FIGS. 2, 3, 4 and 5 are intended for use with a screening panel 11 which is a known screening panel, and not a screening panel 10 in accordance with the invention.

The securing devices 44, 46 shown in FIGS. 2 to 5, are configured to engage locating formations in the form of protrusions 13 on screening panels 11, to locate and secure the screening panels 11 to a screen support frame sub-assembly 36, in the manner described below.

With reference to FIGS. 2, 4 and 6 to 8, a plurality of tubular elements 40 are affixed to the elongate bar 38, the tubular elements 40 being spaced from each other by distances complementary to the spacing between locating recesses 24 and grooves 30 in panels 10 according to the invention, or protrusions 13 in known panels 11, by means of which the screening panels 10, 11 are located and/or secured to the elongate bar 38 and thereby to a support frame of similar kind to the support frame 80 (FIG. 13). The width of the elongate bar 38 is smaller than the cross-sectional dimension of the primary socket 42.

In the version of this embodiment of the invention shown in FIGS. 2 and 3 of the drawings, the connecting formation in the primary socket 42 is a ridge or lip 52 extending peripherally around the upper open end 41 of the tubular member 40. In this embodiment of the invention, the securing device 44 is of a hard-wearing synthetic plastics material such as polyurethane having a Shore hardness of 95 to 99 Shore A. The device 44 includes an insert 45 which comprises a peripheral flange 54 and a stepped, downwardly depending skirt 56 fast with the flange 54, the flange 54 and skirt 56 defining a secondary opening in the form of a secondary socket 59. An external, radially outwardly facing peripheral groove 58 is defined between the flange 54 and the skirt 56 such that, when the skirt fits with interference into the primary socket 42 defined by the tubular element 40, the peripheral groove 58 engages the lip 52 to retain the device 44 within the primary socket 42, thereby to connect the device 44 to the bar 38.

Instead, in another version, shown in FIGS. 4 and 5 of the drawings, the connecting formation in the primary socket 42 is a screw thread 60. The securing device 46 is then also of hard-wearing synthetic plastics material and includes an insert 61 which comprises a flange 62 extending peripherally around the open upper end of the insert, and a downwardly depending skirt 64 fast with the flange 62, the flange 62 and the skirt 64 defining a secondary opening in the form of a secondary socket 63. An external screw-thread 66 which is complementary to the screw-thread 60 is provided on the outer surface of the skirt 64. The device 46 can be screwed into the socket 42 by means of a key (not shown) which has prongs to fit into key holes 68 provided in the flange 62. In these embodiments of the invention, as shown in FIGS. 2 and 4 of the drawings, the screening panels 11 are provided with protrusions 13 on their under surfaces which, when adjacent panels are brought into register with one another will fit into the secondary sockets 59 and 63 formed in the devices 44, 46, and securing pins 17 are then knocked into complemental bores 19 which are formed when the panels are brought into register with one another, to secure the panels 11 to the elongate bar 38.

It is an advantage of the screen support frame sub-assemblies and the devices 44, 46 according to this aspect of the invention that the devices 44, 46 can easily be replaced when they become worn in use as a result of the stresses placed on the screening panels being transmitted via the protrusions 13 to the inserts 44, 46.

In another version of this aspect of the invention, shown in FIGS. 6 to 10 of the drawings, the devices 48, 49, 50 and 51 include locating protrusions or spigots 28, 29, 31 and 33 which extend axially from the devices. It is to be understood that the versions of the aspect of the invention shown in FIGS. 6 to 10 of the drawings are intended for use with screening panels 10 according to the invention.

In the embodiment shown in FIG. 6 of the drawings, the device 48 includes an insert which comprises a monolithic cylindrical body portion 48.1 provided with a screw-thread 48.2 on its outer surface, which is complementary to a screw-thread 42.1 provided on the inner surface of the primary socket 42 formed by the tubular element 40. The insert 48 also has an annular ridge 70 which has an overhanging radially inwardly directed lip 70.1, which form separate securing formations standing proud of the upper surface 48.3 of the insert 48, and which are receivable with interference within complementary semi-circular recesses 72 provided in panels 10 according to the invention, which semi-circular recesses 72, when the panels are brought into register, form annular recesses. The protrusion or spigot 28 extends axially away from the body 48.1 of the insert 48 and comprises a shank member 28.1 and a head 28.2, which fit with interference into the locating socket 26 formed when adjacent panels 10 according to the invention are brought into register to be secured to an elongate bar 38.

In the embodiment shown in FIGS. 7 and 8 of the drawings, the device 49 is similar to the device 48 of FIG. 6 of the drawings, except that the annular ridge 32 has a rounded upper surface 32.1 which fits with interference into complementary semi-circular securing recess 30 in the panels 10 according to the invention. Furthermore, the protrusion or spigot 29 on the insert 49 comprises a shank 29.1 similar to the shank 28.1 of the insert 48, but a more rounded head 29.2 at the end of the shank 28.1.

In the embodiment shown in FIG. 10 of the drawings, the tubular elements 40 are recessed into the cut outs 39 of the elongate bar 38. The device 51 is similar to the device 48 of FIG. 6 of the drawings, except that the annular ridge 82 has a sharper upper surface 82.1 which will fit with interference into complementary semi-circular recess in the panels 10 according to the invention. The device 51 also includes an insert which comprises a monolithic cylindrical body portion 51.1 provided with an external screw thread 51.2 which is complementary to the screw thread 42.1 provided on the inner surface of the primary socket 42 formed by the tubular element 40. The locating protrusion 33 comprises a shank member 33.1 and a head 33.2 similar to those of the devices 48 of FIG. 6. It is also to be noted that in the embodiment of FIG. 10, when the device 51 is screwed into place into the tubular member 40, the upper surface 51.3 of the device is flush with the upper surface 38.1 of the elongate bar 38.

In the embodiments of FIGS. 6, 7, 8 and 10, the devices shown are unitary.

Instead, in the embodiment shown in FIG. 9 of the drawings, the securing device 50 comprises an insert 50.1 which comprises a peripheral flange 50.2 and a resiliently deformable skirt 50.3 fast with the flange 50.2, a peripheral radially outwardly facing groove 50.4 being defined in the body portion between the flange 50.2 and the skirt 50.3, and an annular ridge which stands proud axially of the peripheral flange 50.2. The insert 50.1 defines an axial bore 50.6 for receiving a separate pin 90, which pin 90 incorporates a shank 90.1 and a head 90.2. In this embodiment, an elongate screen support member can be in the form of an elongate channel iron section 100 having openings 102 formed therein or an elongate bar 38 having openings in the form of a primary socket 42 as shown in FIG. 2, at desired intervals as described before. When the securing device 50 is to be used on existing screen support frames which comprise said elongate bars 38 or channel irons 100, the resiliently deformable portion 50.3 can be urged into the openings 42 in the tubular members 40, or openings 102 in the channel iron, as the case may be. Thereafter, the pin 90 which is formed with a bulge 91 is urged into the axial bore, the bulge 91 expanding the skirt 50.3 and the peripherally radially outwardly facing groove 50.4 engaging with the edges of the opening 102, or the lip 52, as the case may be, to connect the securing device 50 to the channel section 100 or bar 38 as the case may be. The panels 10 according to the invention can then be located and secured on the channel sections 100 or bars 38 in the manner similar to that described with reference to FIGS. 6 to 8 above. The particular advantage of this embodiment of the securing device and screening panel of the invention is that they can be used on existing screen support frames which are made of channel iron sections 100, or bars 38 having tubular members 40 as shown in FIG. 2 affixed thereto.

A screen support frame sub-assembly 36 as shown in FIGS. 11 and 12 of the drawings comprises an elongate bar 38 having cut outs 39 therein, and a plurality of tubular elements 40 affixed thereto, the tubular elements 40 being spaced from each other by distances complementary to the spacing between locating recesses 24 and grooves 30 in the panels 10 according to the invention.

A screen support frame 80 as shown in FIG. 13 of the drawings comprises a plurality of elongate bars 38 as described, which are spaced from and parallel to each other and spaced apart from each other by spacer bars 78, thereby to form a grid-like structure on which screening panels 10, 11 can be fitted as described, to provide a screening arrangement.

It is an advantage of the embodiment of the invention as illustrated in FIGS. 6 to 10 of the drawings that the devices 48, 49, 50 and 51 have, in combination, locating formations in the form of the protrusions or spigots 28, 29, 31 and 33 as well as separate securing formations in the form of the annular ridges 70, 82, 32, and 50.5 respectively, which engage complementary formations 30 and 72 on the screening panels 10 in accordance with the invention. The locating protrusions locate the panels in place on the elongate support bars 38, and the annular ridges secure the panels in place against transverse movement on the elongate support bar 38, or the channel sections 100 as the case may be, in use. In conventional screening panels known to the Applicant, in the absence of a combination of the protrusions 28, 29 and the annular ridges 70, 32 and complemental recesses 72, 30 in the panels 10, the panels 10 tend to become dislodged and move transversely across a screen in use. It is a further advantage that the screening area of a panel which is available is increased by virtue of the fact that only half of the periphery of a panel 10 rests on the elongate support bar 38. It is yet a further advantage that, the securing devices 48 and 50 also being of hard wearing synthetic plastics material, ensures easier mating and disconnection of the panels 10 from the protrusions 28 and annular ridges 32 in use when required to do so, either to replace the panels 10, the securing devices 48, 50, or both.

The invention claimed is:

1. A screen support frame sub-assembly comprising:
an elongate bar having a cut-out into which is recessed a tubular element, wherein said tubular element is connected to said cut-out through a weld, said tubular element defining a threaded inner surface; and
a monolithic securing device that contains a hard-wearing plastic material, said securing device comprising a substantially cylindrical body portion having an external screw thread that is complementary and releasably connected to said threaded inner surface of said tubular element so that an upper surface of said securing device is substantially flush with an upper surface of said elongate bar, said securing device further comprising a shank member that extends axially away from said body portion and a head formed at a free end of said shank member, said head being engageable with a complementary locating recess on a screening panel.

2. The screen support frame sub-assembly as defined in claim 1, wherein said securing device further comprises a securing protrusion that is engageable with a complementary securing recess on the screening panel.

3. The screen support frame sub-assembly as defined in claim 2, wherein said securing protrusion comprises an annular ridge that stands proud axially of said body portion and at least partly around said shank member.

4. The screen support frame sub-assembly as defined in claim 1, wherein multiple securing devices are threadedly and releasably connected to said elongate bar.

5. The screen support frame sub-assembly as defined in claim 1, wherein said elongate bar has a rectangular cross-sectional profile.

6. The screen support frame sub-assembly as defined in claim 1, wherein said securing device comprises polyurethane.

7. The screen support frame sub-assembly as defined in claim 1, wherein said head is engageable with a complementary semi-circular locating recess on a screening panel.

* * * * *